US010624500B2

(12) United States Patent
Diaz et al.

(10) Patent No.: US 10,624,500 B2
(45) Date of Patent: Apr. 21, 2020

(54) KITCHEN APPLIANCE NOISE BAFFLE (71) Applicant: Hamilton Beach Brands, Inc., Glen Allen, VA (US)

(72) Inventors: Paul Diaz, Richmond, VA (US); Koen Aidan Ambrose, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 245 days.

(21) Appl. No.: 15/965,199

(22) Filed: Apr. 27, 2018

(65) Prior Publication Data

US 2019/0328178 A1    Oct. 31, 2019

(51) Int. Cl.
*H02K 9/06* (2006.01)
*A47J 43/07* (2006.01)
*A47J 43/046* (2006.01)

(52) U.S. Cl.
CPC ......... *A47J 43/0716* (2013.01); *A47J 43/046* (2013.01); *H02K 9/06* (2013.01)

(58) Field of Classification Search
CPC ........ A47J 43/0716; A47J 43/046; H02K 9/06

USPC ......................................................... 366/205
See application file for complete search history.

(56) References Cited

U.S. PATENT DOCUMENTS

2018/0263419 A1* 9/2018 Nernberger ........... A47J 43/046

* cited by examiner

*Primary Examiner* — Huy Tram Nguyen
(74) *Attorney, Agent, or Firm* — Alexander D. Raring (57) ABSTRACT A blender includes: a base unit, the base unit including a vent in fluid communication with external air; a motor mounted within the base unit and configured to drive blender blades; a cooling fan mounted in the base unit to draw air though the vent and past the motor into a reservoir; and a conduit formed within the base unit that provides an exit path for air drawn past an exit port at the rear of the base unit. A central baffle is located within the reservoir that divides the exit path into two lateral substreams that flow past opposite side edges of the central baffle, and two lateral baffles are located within the reservoir downstream of the central baffle. Each lateral baffle directs a respective substream inwardly such that the sub streams combine into a single stream that exits the exit port.

26 Claims, 8 Drawing Sheets

KITCHEN APPLIANCE NOISE BAFFLE

The present invention relates to a kitchen blender, and more specifically to techniques for reducing motor noise in a blender.

BACKGROUND OF THE INVENTION

Kitchen countertop appliances incorporate electric motors operable to slice, dice, crush, mix, blend or otherwise process food and drink products. The motors, which generally operate at high speeds, are cooled to operate efficiently. Typically, electric appliance motors are cooled by a fan integral to the motor wherein the fan blows air on or draws air over the motor during operation.

Unfortunately, many existing appliance cooling systems are inefficient. This commonly occurs because the appliance moves an insufficient volume of cooling air, often due to vents of inadequate surface area, and/or may have an inefficient air outlet configuration. These inefficiencies may result in reduced cooling.

In addition to cooling the motor, fan operation creates noise. Consequently, if a designer tries to compensate for the poor cooling of a motor with a more aggressive fan, the result creates even more noise. Thus, there is a balance that must be struck between the power level of the fan (which increases cooling by drawing more air over the motor) with noise generation (a more powerful motor may generate more noise). The exit outlet of the cooling air may be a particularly prominent outlet for motor/fan noise. As such, different designs of motors, fans, and blender housings demand new air flow designs.

SUMMARY

As a first aspect, embodiments of the invention are directed to a blender. The blender comprises: a base unit, the base unit including a vent in fluid communication with external air; a motor mounted within the base unit and configured to drive blender blades; a cooling fan mounted in the base unit to draw air though the vent and past the motor into a reservoir; and a conduit formed within the base unit that provides an exit path for air drawn past an exit port at the rear of the base unit. A central baffle is located within the reservoir that divides the exit path into two lateral sub streams that flow past opposite side edges of the central baffle, and two lateral baffles are located within the reservoir downstream of the central baffle. Each lateral baffle directs a respective substream inwardly such that the substreams combine into a single stream that exits the exit port.

As a second aspect, embodiments of the invention are directed to a blender, comprising: a base unit, the base unit including a vent in fluid communication with external air; a motor mounted within the base unit and configured to drive blender blades; a cooling fan mounted in the base unit to draw air though the vent and past the motor into a reservoir; and a conduit formed within the base unit that provides an exit path for air drawn past an exit port at the rear of the base unit. The conduit is formed partially by a baffle channel positioned below the fan that includes a floor, a front wall and opposed side walls. A central baffle extends upwardly from the floor, the central baffle including side edges spaced apart from the side walls, thereby forming lateral gaps therebetween. A pair of lateral baffles extend upwardly from the floor and inwardly from respective side walls, wherein free ends of the lateral baffles are spaced apart from each other to form a central gap therebetween, the central gap being located rearwardly from the lateral gaps.

As a third aspect, embodiments of the invention are directed to a blender, comprising: a base unit, the base unit including a vent in fluid communication with external air; a motor mounted within the base unit and configured to drive blender blades; a cooling fan mounted in the base unit to draw air though the vent and past the motor into a reservoir; and a conduit formed within the base unit that provides an exit path for air drawn past an exit port at the rear of the base unit. The conduit is formed by a baffle channel positioned below the fan and a lower housing. The baffle channel includes a floor, a front wall and opposed side walls. A central baffle extends upwardly from the floor, the central baffle including side edges spaced apart from the side walls, thereby forming lateral gaps therebetween. A pair of lateral baffles extend upwardly from the floor and inwardly from respective side walls, wherein free ends of the lateral baffles are spaced apart from each other to form a central gap therebetween, the central gap being located rearwardly from the lateral gaps.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
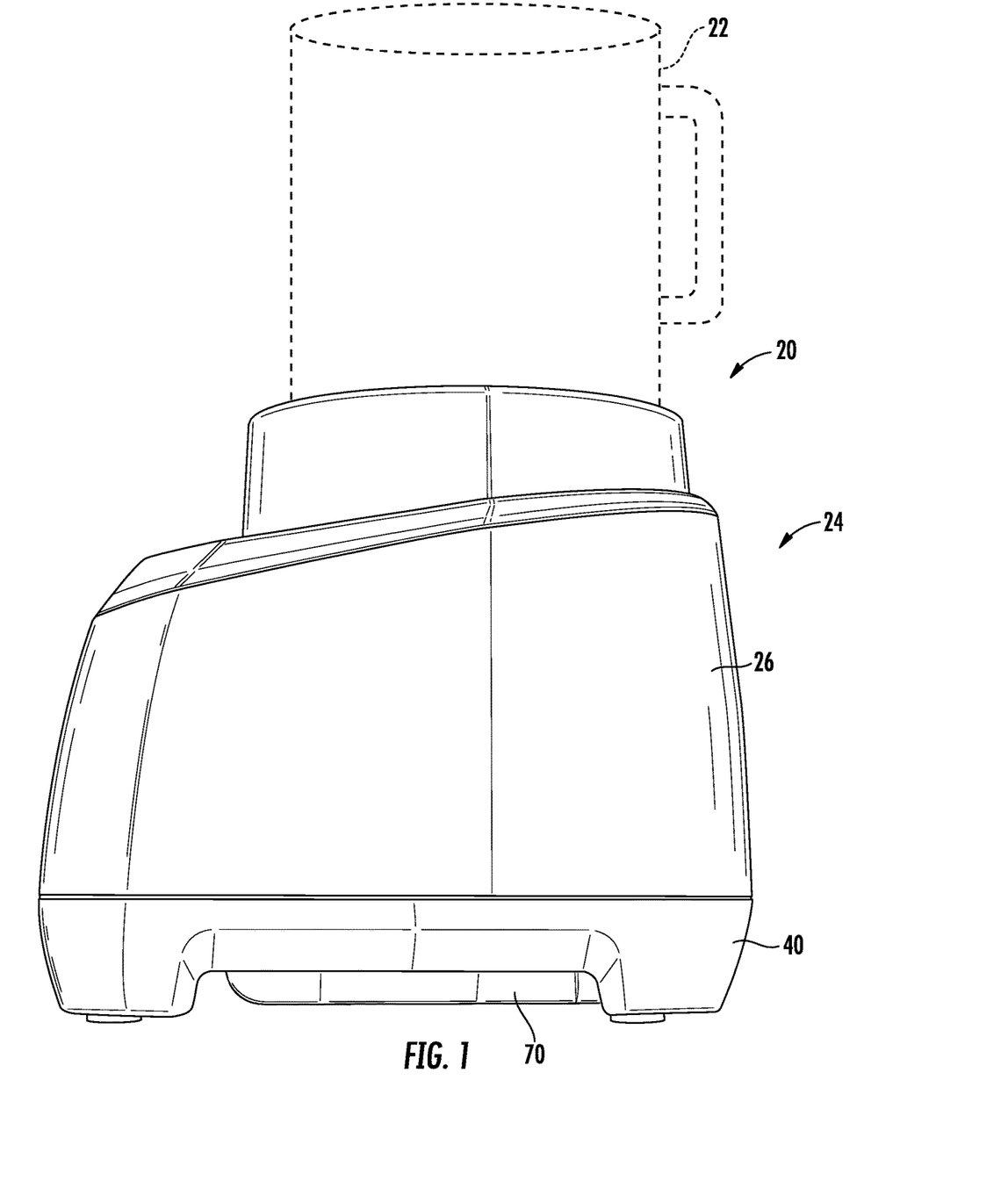
FIG. 1 is a perspective view of a countertop blender according to embodiments of the disclosure.
Figure 2:
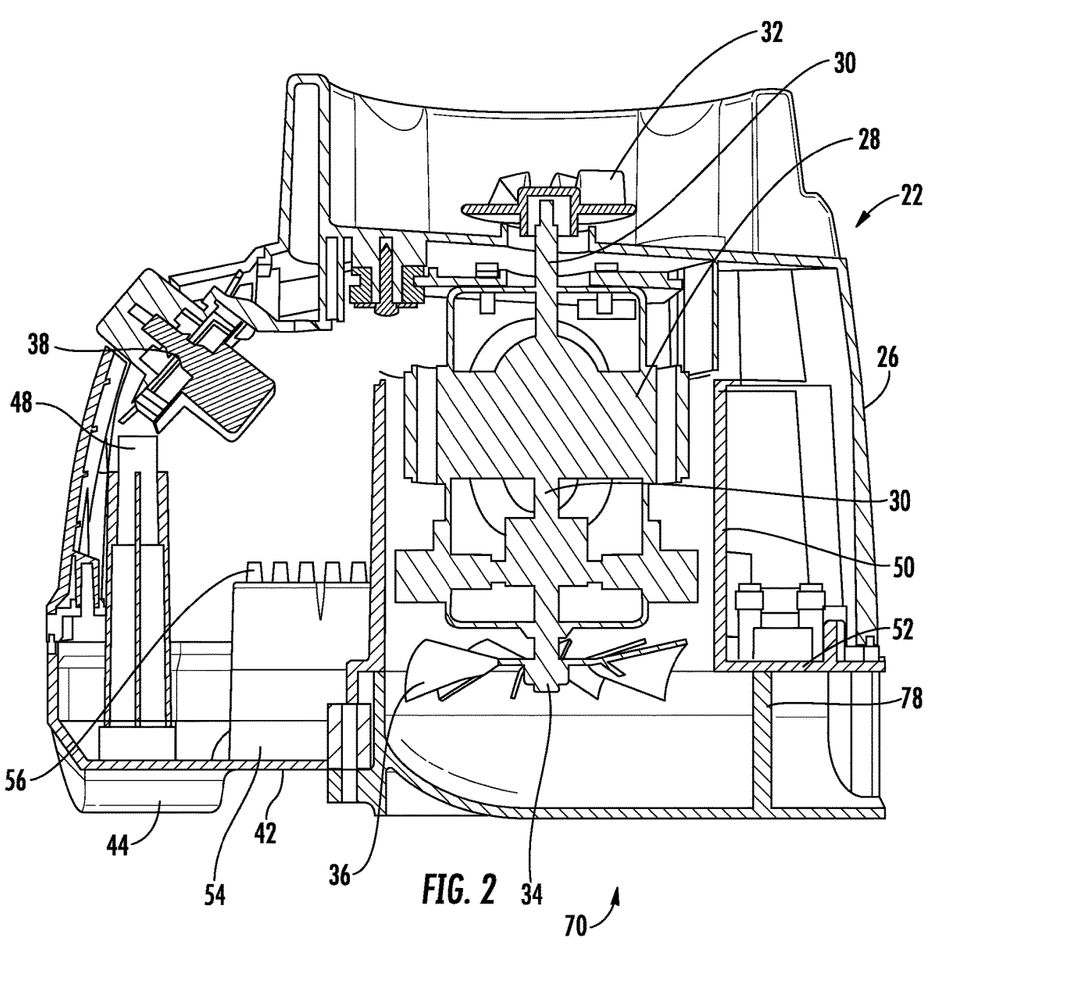
FIG. 2 is a side section view of the blender of FIG. 1.

Referring now to the drawings, a countertop blender, designated broadly at 20, is shown in FIG. 1. The blender 20 includes a removable vessel 22 (shown in broken line) that receives ingredients for blending. The vessel 22 sits atop a base unit 24. As can be seen in FIG. 2, the base unit 24 includes an upper housing 26, a motor 28 that is attached via a shaft 30 to impellers 32 that drive blades within the vessel 22 for blending, a fan 34 with blades 36 mounted under the motor 28, and a control box 38 with buttons, dials, or other devices for activating the blender 20 and/or adjusting its operation parameters (e.g., speed). Those of skill in this art will recognize that these components may be of conventional construction and operation and need not be described in detail herein.

The control box 38 is mounted to the front of the base unit 24, thereby defining the "front" or "forward" direction for descriptive purposes of components discussed herein. The "rear" direction is, naturally, opposite the front direction. As used herein, the "lateral" direction means either horizontal direction originating at the midline of the base unit 24 and extending normal thereto, whereas "inward" refers to the opposite of the lateral direction.

The base unit 24 also includes a lower housing 40 (see FIGS. 2-7). The lower housing 40, typically formed of a polymeric material such as acrylonitrile-butadiene-styrene (ABS), is located below the upper housing 26, with much of the lower housing 40 being enclosed by the upper housing 26. The lower housing 40 includes a foundation 42 with four foot pedestals 44 that receive feet 46. Bosses 48 rise from the pedestals 44 to provide attachment points to the upper housing 26 and other components, such as the control box 38. A raised platform 52 is located above the foundation 42 in the center and rear portions of the lower housing 40.

A generally cylindrical shroud 50 extends upwardly from the center of the raised platform 52 of the lower housing 40. As can be seen in FIG. 2, the shroud 50 circumferentially surrounds the motor 28 and the fan 34. Vent chambers 54 with vents 56 in their upper surfaces are located on either side of the shroud 50.

A baffle channel 70 is positioned below the lower housing 40 (see FIGS. 2-4, 8 and 9). The baffle plate 70 has a concave floor 71. A semicircular end wall 72 rises from the forward end of the floor 71, and side walls 74, 76 rise from opposite sides of the floor 71 rearwardly of the end wall 72. A central baffle 78 extends upwardly from the floor 71, with gaps 80 present between the sides walls 74, 76 and the side edges 79 of the central baffle 78. A lateral baffle 82 extends inwardly from each side wall 74, 76 rearwardly of the central baffle 78. Each lateral baffle 82 is disposed at an obtuse angle (typically between about 100 to 130 degrees relative to its adjacent side wall 74, 76, and includes a curved free end 84. An exit gap 85 is present between the free ends 84 of the lateral baffles 82; because the free ends 84 laterally overlap the side edges 79 of the central baffle 78, the gap 85 is narrower than the central baffle 78. The baffle channel 70 also has two lateral bosses 87 that extend from the side walls 74, 76 and an end boss 86 that extends from the end wall 72 for attaching the baffle channel 70 to the lower housing 40.

Figure 3:
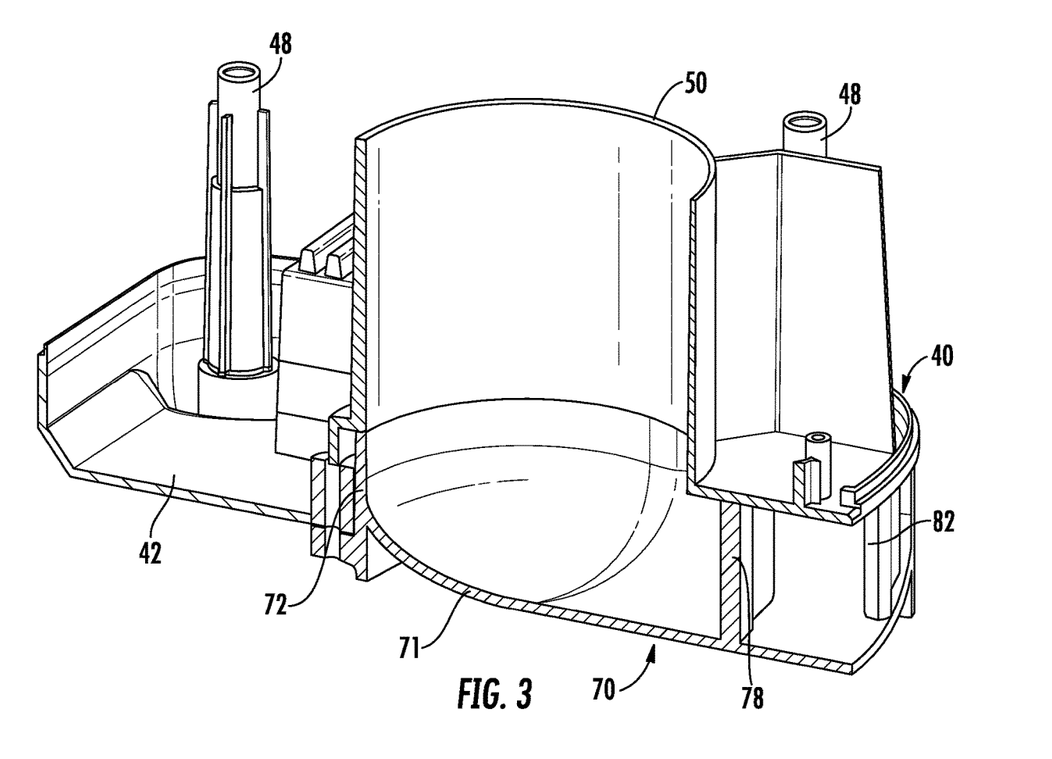
FIG. 3 is a side perspective section view of the lower housing and the baffle channel of the blender of FIG. 1.
Figure 4:
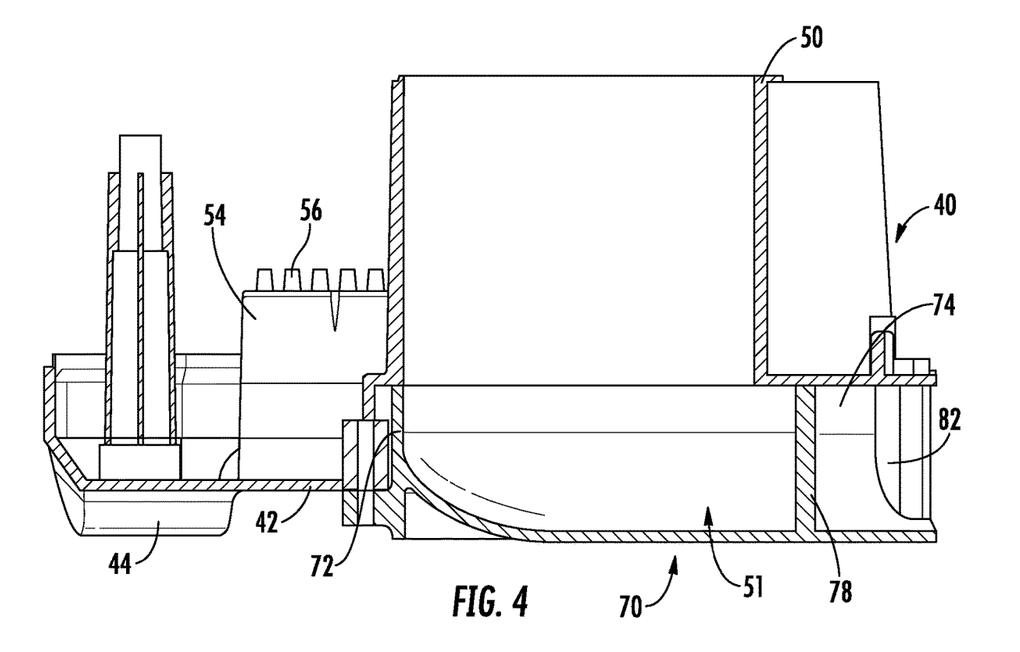
FIG. 4 is a side section view of the lower housing and baffle channel of FIG. 3.
Figure 5:
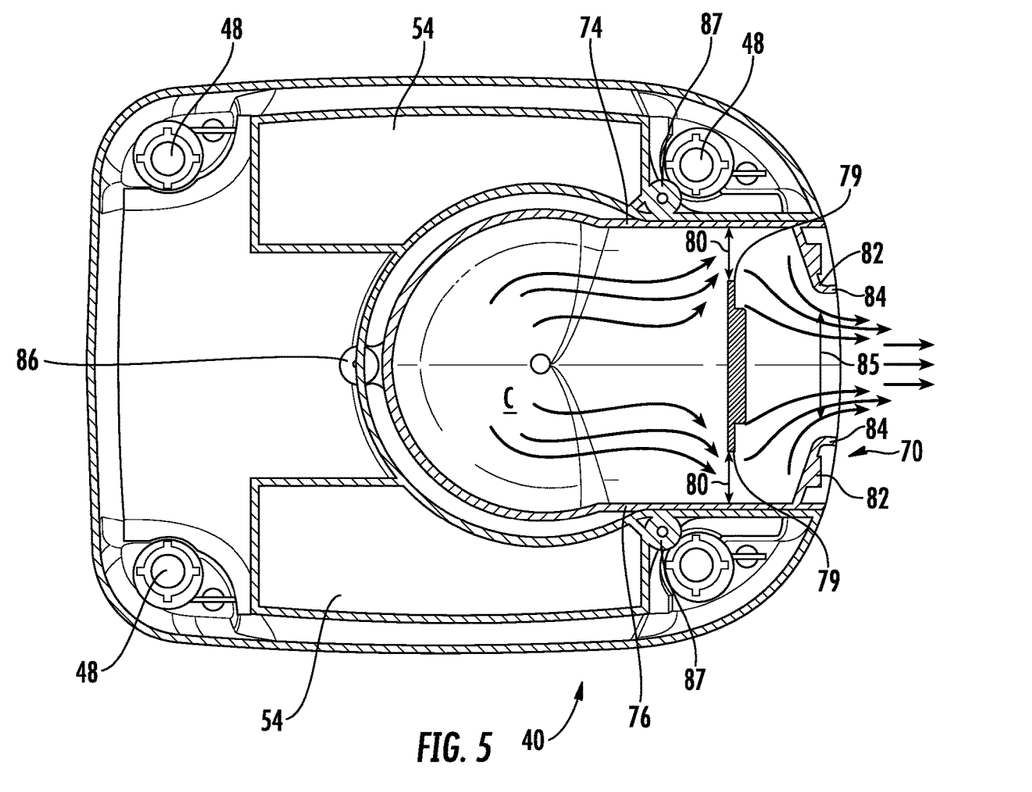
FIG. 5 is a top section view of the lower housing and baffle channel of FIG. 3.
Figure 6:
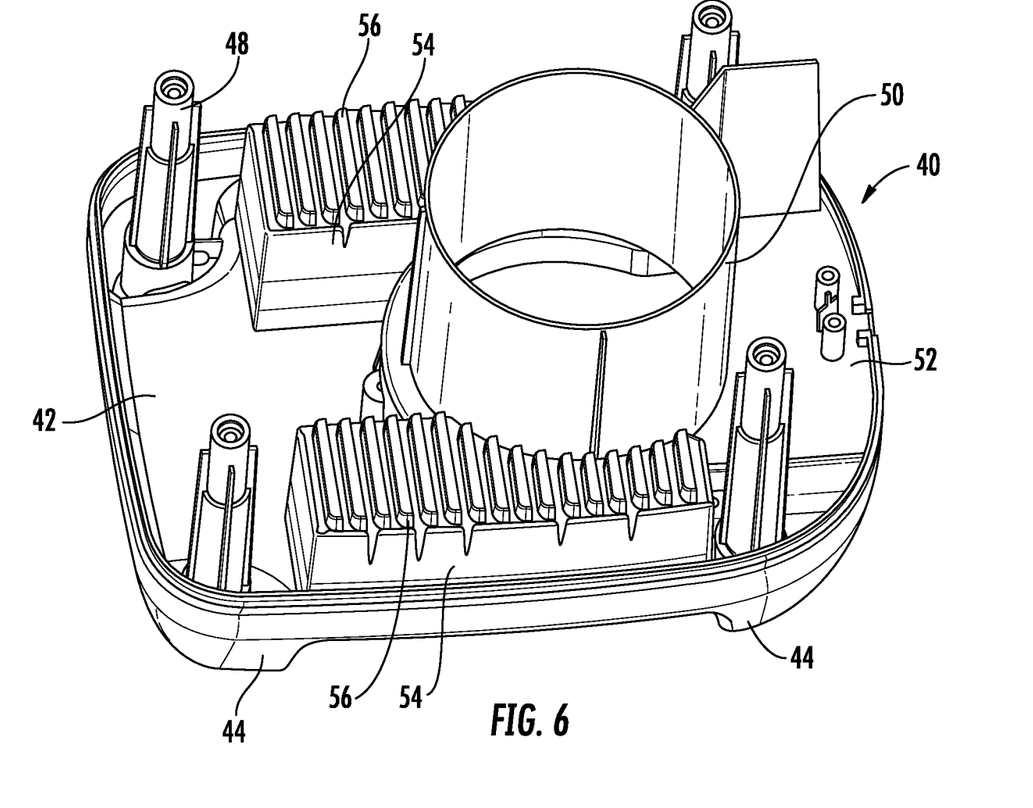
FIG. 6 is a top perspective view of the lower housing of the blender of FIG. 1.
Figure 7:
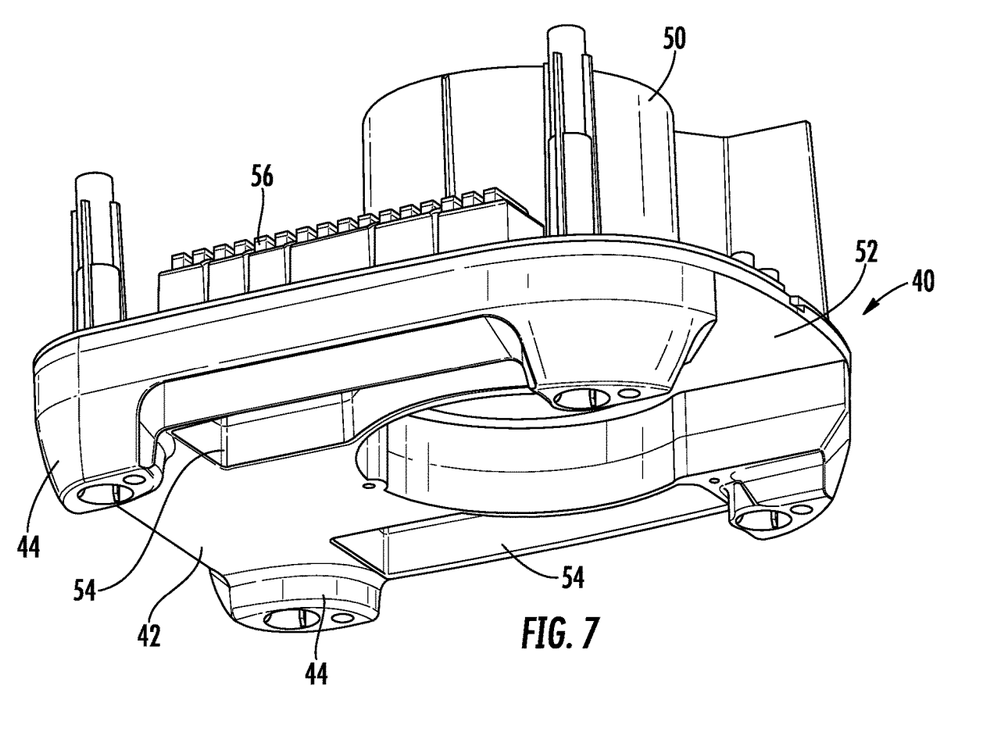
FIG. 7 is a bottom perspective view of the lower housing of FIG. 6.
Figure 8:
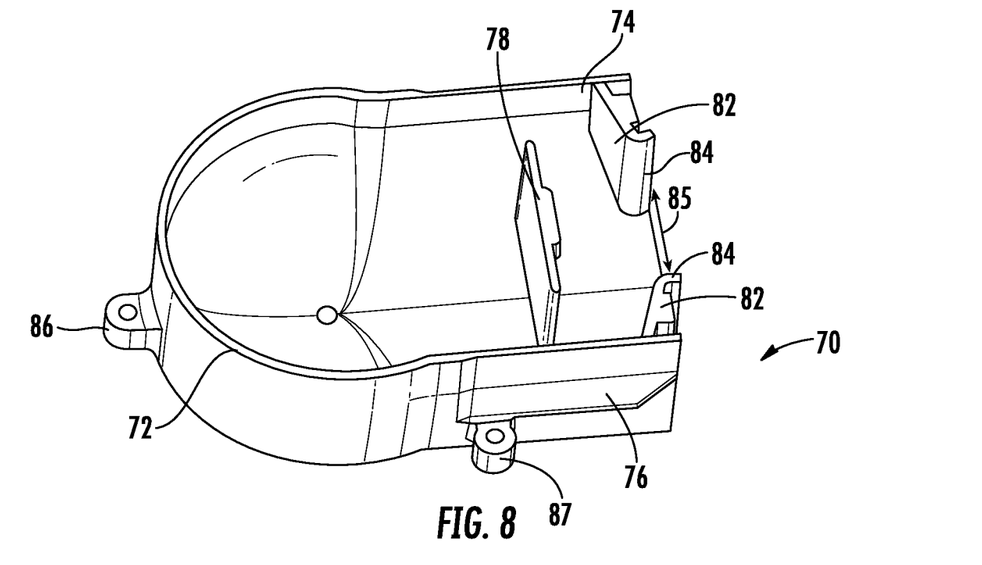
FIG. 8 is a side perspective view of the baffle channel of FIG. 3.
Figure 9:
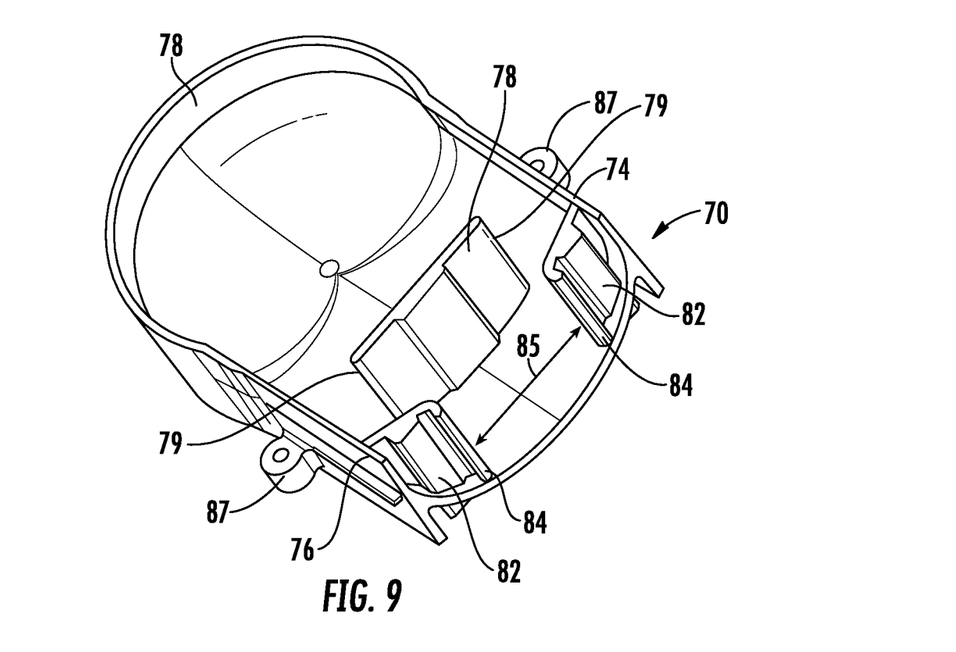
FIG. 9 is an opposite side perspective view of the baffle channel of FIG. 3.

As can be seen in FIGS. 3 and 4, the baffle channel 70 resides underneath the lower housing 40. The upper edge of the end wall 72 meets the lower edge of the shroud 50. The upper edges of the side walls 74, 76 meet the lower surface of the raised platform 52. Similarly, the upper edge of the central baffle 78 abuts the lower surface of the raised platform 52, as do the upper edges of the lateral baffles 82. Thus, together the baffle channel 70 and the lower housing 40 form a conduit C for air to follow after exiting the fan 32.

As discussed above, the fan 34 is included to provide cooling to the motor 28. When in operation, the motor 28 generates considerable heat. Typically the motor 28 is configured to be disabled or otherwise deactivated upon reaching a specified temperature in order to prevent overheating. As such, the fan 34 is included to drawing cooling air past the motor 28. More specifically, air enters the base unit 24 from beneath the sides of the lower housing 40 below the vent chambers 54. Air is drawn through the vents 56 and into the space within the upper housing 26. From there, the fan 34 draws air downwardly through the shroud 50 and into a reservoir 51 beneath the fan 34 bounded by the baffle channel 70. The flow path is diverted by the floor 71 toward the rear of the blender 20 (i.e., away from the end wall 72, where it confronts the central baffle 78). At this point the air path is diverted sideways into the gaps 80 as two substreams (shown by arrows in FIG. 5). Air continues to flow rearwardly in two substreams from the gaps 80 to the lateral baffles 82, where each substream is diverted inwardly to rejoin as a single stream. The single air stream then exits the blender 20 through the exit gap 85.

As noted above, the exit pathway for cooling air can be a source of noise for a blender, as sound waves from the motor and fan can follow the pathway without a physical barrier that would provide sound insulation. In the blender 20, the presence of components of the conduit C can assist in reducing noise passing through the conduit C. First, changes in direction of the noise tend to attenuate the noise. Thus, the flow decreases as sound waves reach each of (a) the floor 71 of the baffle channel 70, (b) the central baffle 78, and (c) the lateral baffles 82. Second, the combination of two chambers (in which volume is relatively large) on either side of a choke point (in which the conduit C narrows significantly in cross-section) also tend to attenuate the noise; the expansion in volume from the gap 80 into the space beyond the gaps 80 causes the sound waves to lose energy, which reduces noise. As a result of these various conditions that the sound waves experience, very little noise exits the exit gap 85. Thus, the motor 28 of the blender 20 is able to provide sufficient power with adequate cooling and at a noise level that is acceptable to most consumers.

Also, it is notable that the conduit C is relatively lengthy while using available space within the base unit 24 to discharge cooling air and attenuate noise. More specifically, the conduit C travels below the motor 28 and fan 34, rearward to the central baffle 78, laterally to the gaps 80, rearwardly through the gaps 80, rearwardly to the lateral baffles 82, inwardly to the exit gap 85, and out of the exit gap 85. As such, cooling air and sound travel approximately 1.5 times the "front to rear" dimension of the base unit 24.

Those of skill in this art will appreciate that the blender 20 may take other forms. For example, the motor 28 may be of a different size or configuration, or in some embodiments may be separate from the fan 34. The fan 34 may have blades 36 of a different configuration. The shroud 50 may be taller or shorter, or may be positioned higher or lower on the lower housing 40. The lower housing 40 may be configured with vents 56 in a different location, the vents 56 may be located on a different component, and/or the vents 56 may be located on only one side of the base unit 24, such that the intake of environmental air for cooling occurs at a different position. In some embodiments, the lower and upper housings 40, 26 may be configured such that some features of one component are present on the other, or these components may be formed in multiple separate pieces.

Also, the conduit C may take a different configuration. For example, one or more of the central baffle 78 and the lateral baffles 82 may be omitted, or may be configured differently, or additional baffles may be included. The gaps 80, 85 may be located or sized differently, or may be formed with different components (for example, upper portions of the central baffle 78 and/or the lateral baffles 82 may be formed on the underside of the raised platform 52 and abut corresponding structures rising from the baffle channel 70). The flow direction of the cooling air may vary; as one example, cooling air may enter the base unit 22 from only one side of thereof rather than from both sides, or even from the front of the base unit. Other variations of the blender may also be employed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A blender, comprising:
    a base unit, the base unit including a vent in fluid communication with external air;
    a motor mounted within the base unit and configured to drive blender blades;
    a cooling fan mounted in the base unit to draw air though the vent and past the motor into a reservoir; and
    a conduit formed within the base unit that provides an exit path for air drawn past an exit port at the rear of the base unit, wherein a central baffle is located within the reservoir that divides the exit path into two lateral substreams that flow past opposite side edges of the central baffle, and wherein two lateral baffles are located within the reservoir downstream of the central baffle, each lateral baffle directing a respective substream inwardly such that the substreams combine into a single stream that exits the exit port.

2. The blender defined in claim 1, wherein each of the lateral baffles has a free end, and wherein the free ends of the lateral baffles laterally overlap with the side edges of the central baffle.

3. The blender defined in claim 1, wherein each of the lateral baffles is disposed at an obtuse angle relative to the central baffle.

4. The blender defined in claim 1, wherein the conduit is formed by a lower housing and a baffle channel.

5. The blender defined in claim 4, wherein the lower housing includes a generally cylindrical shroud that surrounds the motor.

6. The blender defined in claim 4, wherein the vent is located in the lower housing, and wherein the lower housing is configured such that air enters the vent from underneath a side of the base unit.

7. The blender defined in claim 6, wherein the vent is a plurality of vents, and wherein at least one of the plurality of vents is located on each side of the lower housing.

8. The blender defined in claim 1, wherein the fan is attached to a shaft of the motor.

9. The blender defined in claim 1, further comprising a control unit mounted on a front portion of the base unit.

10. A blender, comprising:
    a base unit, the base unit including a vent in fluid communication with external air;
    a motor mounted within the base unit and configured to drive blender blades;
    a cooling fan mounted in the base unit to draw air though the vent and past the motor into a reservoir; and
    a conduit formed within the base unit that provides an exit path for air drawn past an exit port at the rear of the base unit, the conduit formed partially by a baffle channel positioned below the fan, the baffle channel including a floor, a front wall and opposed side walls, wherein a central baffle extends upwardly from the floor, the central baffle including side edges spaced apart from the side walls, thereby forming lateral gaps therebetween, and wherein a pair of lateral baffles extend upwardly from the floor and inwardly from respective side walls, wherein free ends of the lateral baffles are spaced apart from each other to form a central gap therebetween, the central gap being located rearwardly from the lateral gaps.

11. The blender defined in claim 10, wherein the free ends of the lateral baffles laterally overlap with the side edges of the central baffle.

12. The blender defined in claim 10, wherein each of the lateral baffles is disposed at an obtuse angle relative to the central baffle.

13. The blender defined in claim 10, wherein the conduit is formed by a lower housing and the baffle channel.

14. The blender defined in claim 13, wherein the lower housing includes a generally cylindrical shroud that surrounds the motor.

15. The blender defined in claim 13, wherein the vent is located in the lower housing, and wherein the lower housing is configured such that air enters the vent from underneath a side of the base unit.

16. The blender defined in claim 15, wherein the vent is a plurality of vents, and wherein at least one of the plurality of vents is located on each side of the lower housing.

17. The blender defined in claim 10, wherein the fan is attached to a shaft of the motor.

18. The blender defined in claim 10, further comprising a control unit mounted on a front portion of the base unit.

19. A blender, comprising:
    a base unit, the base unit including a vent in fluid communication with external air;
    a motor mounted within the base unit and configured to drive blender blades;
    a cooling fan mounted in the base unit to draw air though the vent and past the motor into a reservoir; and
    a conduit formed within the base unit that provides an exit path for air drawn past an exit port at the rear of the base unit, the conduit formed by a baffle channel positioned below the fan and a lower housing, the baffle channel including a floor, a front wall and opposed side walls, wherein a central baffle extends upwardly from the floor, the central baffle including side edges spaced apart from the side walls, thereby forming lateral gaps therebetween, and wherein a pair of lateral baffles extend upwardly from the floor and inwardly from respective side walls, wherein free ends of the lateral baffles are spaced apart from each other to form a central gap therebetween, the central gap being located rearwardly from the lateral gaps.

20. The blender defined in claim 19, wherein the free ends of the lateral baffles laterally overlap with the side edges of the central baffle.

21. The blender defined in claim 19, wherein each of the lateral baffles is disposed at an obtuse angle relative to the central baffle.

22. The blender defined in claim 19, wherein the lower housing includes a generally cylindrical shroud that surrounds the motor.

23. The blender defined in claim 19, wherein the vent is located in the lower housing, and wherein the lower housing is configured such that air enters the vent from underneath a side of the base unit.

24. The blender defined in claim 23, wherein the vent is a plurality of vents, and wherein at least one of the plurality of vents is located on each side of the lower housing.

25. The blender defined in claim 19, wherein the fan is attached to a shaft of the motor.

26. The blender defined in claim 19, further comprising a control unit mounted on a front portion of the base unit.

* * * * *